United States Patent
Huston et al.

(10) Patent No.: US 8,019,316 B2
(45) Date of Patent: Sep. 13, 2011

(54) LOWER POWER WAKE-UP DEVICE

(75) Inventors: James Huston, Boulder Creek, CA (US); James R. Milne, Ramona, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 780 days.

(21) Appl. No.: 12/151,214

(22) Filed: May 5, 2008

(65) Prior Publication Data
US 2009/0275302 A1    Nov. 5, 2009

(51) Int. Cl.
H04B 1/06    (2006.01)
(52) U.S. Cl. .................................. 455/343.1; 455/343.3
(58) Field of Classification Search ............... 455/550.1, 455/574, 343.1, 343.2, 343.3, 343.4; 340/7.34, 340/10.31, 10.33
See application file for complete search history.

(56) References Cited

U.S. PATENT DOCUMENTS

| | | | | |
|---|---|---|---|---|
| 4,955,038 | A * | 9/1990 | Lee et al. .................... | 455/343.1 |
| 5,822,689 | A * | 10/1998 | Hwang ......................... | 340/7.34 |
| 6,100,814 | A | 8/2000 | Doyle | |
| 6,593,845 | B1 | 7/2003 | Friedman et al. | |
| 7,209,728 | B2 * | 4/2007 | Ogura ........................ | 455/343.1 |
| 2005/0046546 | A1 | 3/2005 | Masudaya | |
| 2005/0215210 | A1 | 9/2005 | Walker et al. | |
| 2006/0229053 | A1 | 10/2006 | Sivard | |
| 2007/0049991 | A1 | 3/2007 | Klostermann et al. | |
| 2007/0082647 | A1 * | 4/2007 | Behzad et al. ............. | 455/343.1 |

OTHER PUBLICATIONS

"3D Low Power Wake Up Receiver,"Data Sheet, Austriamicrosystems, 2007.
"Tire Pressure Monitoring Increases Automotive Safety," EPN Online, 2005.
"ZL70100 Medical Implantable RF Transceiver," Zarlink Semiconductor, Inc., 2007.

* cited by examiner

*Primary Examiner* — Thanh Le
(74) *Attorney, Agent, or Firm* — Miller Patent Services; Jerry A. Miller

(57) ABSTRACT

A circuit producing a wake-up signal with a frequency selective RF amplifier that produces an amplified RF output. An RF detector detects the RF output and produces a signal W indicative of the the RF output signal's presence. A threshold detector determines if the amplified output signal has reached a predetermined threshold and produces an output T. A clock signal is generated in response to the threshold detector output signal T. A data decoder logic circuit turns off the clock in the absence of an RF output signal for a time period and decodes the RF detector output W into a stream of output signals. A serial comparator compares a most recent stream of N output data from the data decoder logic with a stored reference to generate a wake-up signal that enables power to an electronic system. This abstract is not to be considered limiting, since other embodiments may deviate from the features described in this abstract.

23 Claims, 6 Drawing Sheets

LOWER POWER WAKE-UP DEVICE

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Energy consumption is a major obstacle for realizing a practical bi-direction RF remote control, as well as many other electronic devices. In such devices, energy is consumed and wasted when an infrequently used radio device must be responsive. Currently known devices generally utilize a periodic power-up and sample as a mechanism for conserving energy. In such devices, the less frequent the power-up and sample cycle, the more energy saved. However, decreasing the sample rate makes the device less responsive, since it may have to await the next sample before it can awaken.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
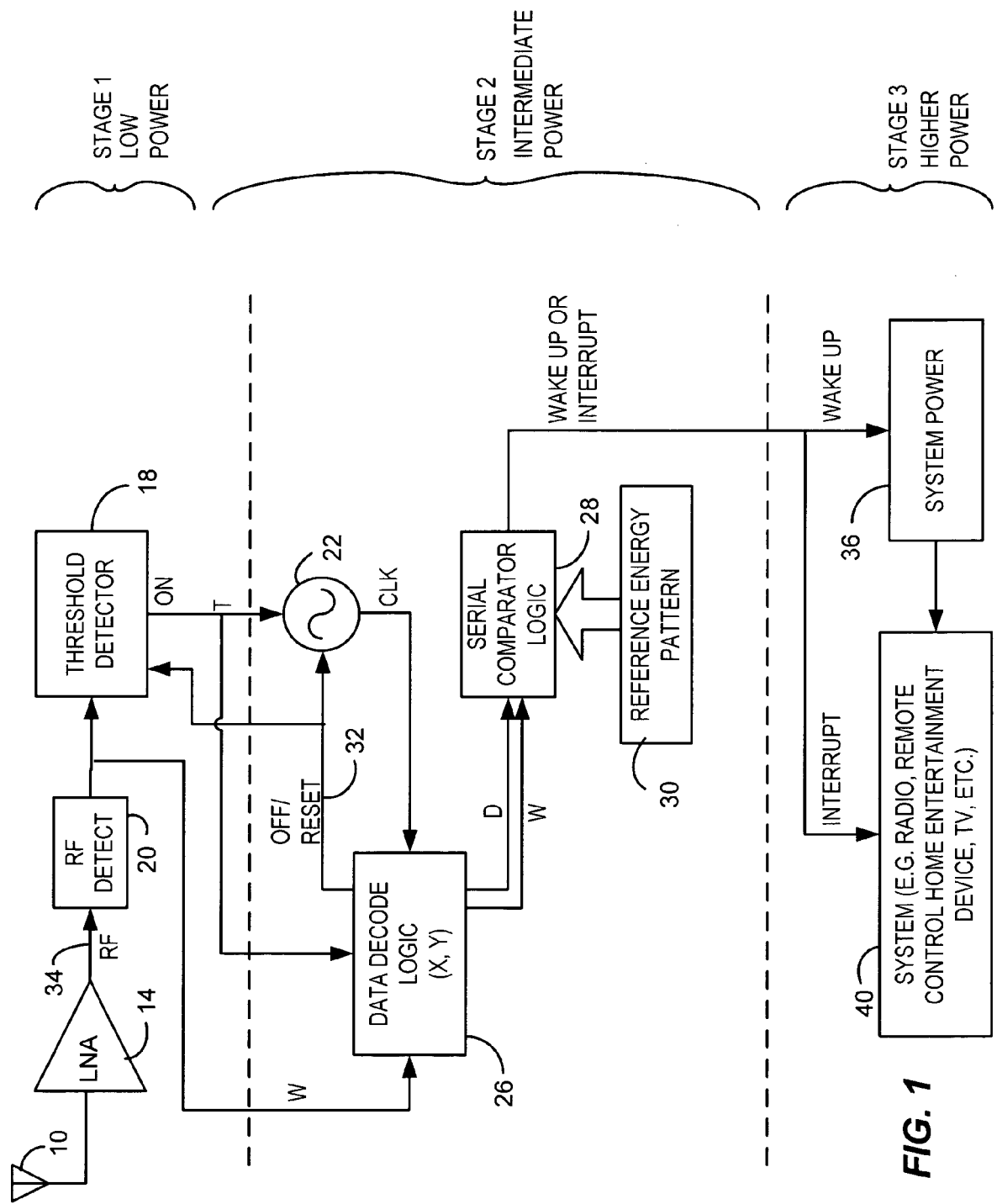
FIG. 1 is a block diagram of an exemplary wake-up circuit consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

An apparatus consistent with certain embodiments of the present invention allows very low "standby" power consumption, while becoming rapidly responsive when radio activity is directed to the device. In certain embodiments, the present invention can be incorporated into a remote control device, and particularly a two way remote control device, to permit RF communication with minimal power, or may be realized in a lower power controlled device such as a television set in order to reduce standby requirements when awaiting a control signal from a remote controller.

Keeping a full radio, decoder, and processor powered to detect a power on command may involve thousands or tens of thousands of transistors. Further, the higher the radio frequency, the more transistors states change, the higher the power required in the standby mode (infrared remote control wakeup is low power for the most part because the data rate is relatively low). In accord with embodiments consistent with the present invention, more energy is used by the RF sending device (by requiring many packets to be sent, instead of one) so that the receiver can save power. This is a very favorable trade-off when the incidence of such wakeup signals is infrequent.

Referring now to FIG. 1, an exemplary embodiment is depicted in which an antenna 10 receives signals from a sending device (e.g., an RF remote controller device receives signals from an intelligent home entertainment device such as a TV, or vice versa). The signal from the antenna is passed to a low noise amplifier (LNA) 14, which is preceded by or followed by (or integrated with) a filter function so that the resultant output is amplified only for a frequency or frequency band of interest. Moreover, the LNA 14 may incorporate multiple stages of amplification. The output 34 of LNA 14 is passed to an RF detector 20 whose output is in turn passed to a Threshold detector 18. The threshold detector 18 operates to accumulate energy and hold it as in an RF detector 20, but has a longer time constant than RF detector circuit 20 which is designed to provide an approximately real time indication of the presence of energy in the proper RF range at the output of LNA 14. When the threshold detector 18 detects presence of persistent RF energy such that a threshold level of energy is reached, it produces an output T (an ON signal) which turns on a low frequency clock 22.

The term "low frequency clock", as used herein, is application dependent. In remote control applications, the low frequency clock could be as low perhaps 10 kHz, or possibly lower. However a different wireless application may need a 27 MHz or 200 MHz clock (which might be a low frequency compared to other clock rates used in the application). So in the present context, a low frequency clock's frequency is selected to provide a clock that is as low in frequency as possible to conserve power, however the clock frequency should be high enough to get the job done for a particular application, and may be slow compared to at least one other clock rate in circuitry associated with the application. In the remote control application presented herein, it is estimated that with a 10 KHz to 100 KHz clock, the user will not notice significant delays and latency in operation control of the remote control, yet at this rate, substantial energy savings can be realized.

The threshold detector circuit 18 accumulates energy received from LNA 14 via RF detector 20 for a period of time, and if the energy is greater than a threshold energy value (e.g., a reference voltage $V_{REF}$) the state of a clock enable output T from the threshold detector 18 is inverted which in turn causes clock 22 to begin running. The output of the threshold detector 18 is passed to a data decode logic circuit 26 along with the output W of the RF detect circuit 20 and a clock signal from low frequency clock 22. The data decode logic circuit 26 operates to control passing of data D to a serial comparator 28 clocked by the W (write) signal. The serial comparator 28 compares the logic value shifted into the serial comparator 28 to a multi-bit reference pattern represented as a binary number or code used as a synchronization code (e.g., 10011010010101 for example) and stored in a reference energy storage device 30 (e.g., a set of latches, memory, or hard wired connection). If the binary representation of the reference energy pattern is a match, the serial comparator 28 will "set" an output signal such that Stage 3 is brought to a full power state. This is done in one of two manners. The first way is to enable an interrupt line direct to the system controller. A second way, and more preferred, is a GPIO or "wake up" line that enables the rest of the system via the power supply. Those skilled in the art will appreciate upon consideration of the present teachings that other variations are possible without departing from embodiments consistent with the present invention.

When a predetermined time period has elapsed without RF energy the clock is disabled under control of the data decode logic circuit 26 using the OFF signal at 32 which also serves to reset the threshold detector 18.

As noted above, the presence of RF energy in the correct band for a long enough period of time is enough to initially turn on the clock 22 so as to begin the process of determining if valid data are being received. However, any of failure to receive valid data, loss of RF signal or failure to receive a matching synchronization pattern is operative to turn off the clock 22 thereby conserving energy.

In the embodiment depicted in FIG. 1, three Stages of operation are depicted. In the first Stage (Stage 1), only the LNA 14, the threshold detector 18 and the RF detector 20 are operational. This Stage uses only a minimal amount of energy, with the amplifier 14 being the greatest consumer. The threshold detector 18 and the RF detector 20 can be devised as RF detector circuits with two separate time constants and minimal support circuitry for discharge if needed and for level conversion to drive logic circuits.

A second Stage (Stage 2) consumes somewhat more power, however, the logic associated therewith is simple and also consumes a low, but intermediate, amount of power when operational under control of the first Stage. In this Stage, the clock is operational as is the data decode logic, serial comparator 28 and reference energy pattern (if power is needed therefor).

The third Stage (Stage 3) of operation is that wherein the entire system is powered up long enough to accomplish the processing of received commands or other functions as dictated by the specific embodiment and represents normal fully functional power consumption, in general.

Figure 2:
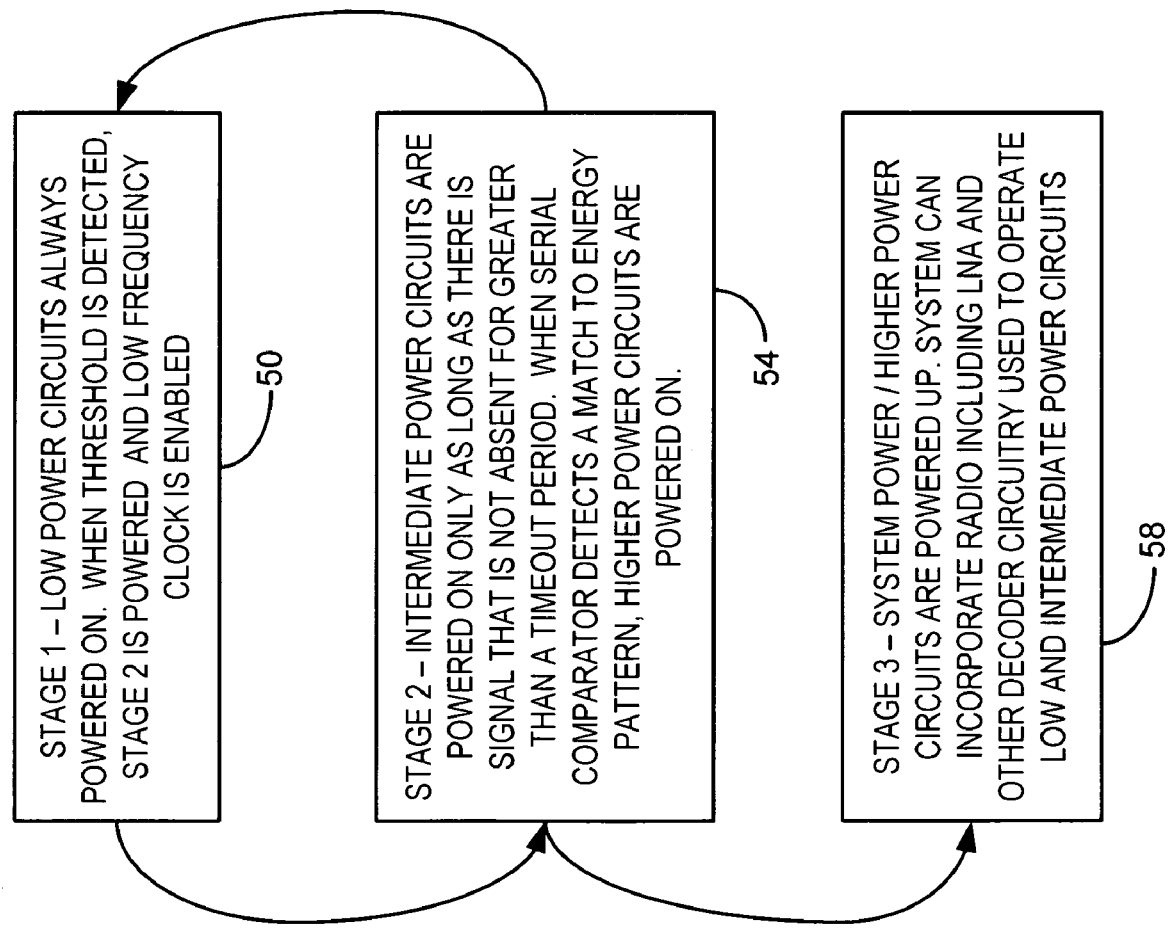
FIG. 2 is a flow chart that describes an overview of various Stages of operation of an exemplary embodiment consistent with the present invention.

One example process explaining the three Stages of operation is depicted in FIG. 2 starting at 50. At 50, the low power Stage 1 operational mode is active (as always in the absence of a separate off control therefor). In Stage 1, the low power circuits are active and when a threshold is detected Stage 2 is powered on to enable the low frequency clock and begin the first stages of data processing. At 54, when entering Stage 2, the intermediate power circuits are powered on only for as long as there is an RF signal that is not absent for more than a specified timeout period (e.g., 8 or 16 clock cycles or the like). When the serial comparator 28 detects an energy pattern that matches the stored energy pattern, the higher power circuits are energized and stage 3 is entered. When Stage 3 is entered at 58, the higher powered systems are powered up. Note that after Stage 3 is powered up, it no longer matters if Stage 2 remains powered or not—it is assumed Stage 3 is not reliant on a continuous signal from Stage 2 to remain powered. If such system incorporates a radio receiver, the radio receiver may utilize the LNA 14 and data may be decoded using the same technique used for detection of a synchronization code in the intermediate power section.

For operation of an exemplary embodiment consistent with the present invention, the clock is first disabled, however, power to the LNA 14 and RF detector 20 and threshold detector 18 is on (if needed). Thus, RF signals can be received at antenna 10 are amplified by the LNA. The threshold detector 18 and RF detector 20 determines if an adequate RF signal is present to produce T and W outputs respectively. The LNA 14 amplifies and filters received signals at its input and pass the signals along while filtering incoming signals to pass only those within the radio band of interest, and then outputs amplified energy of selected incoming radio signals. The Low Frequency Clock at this point is disabled thereby conserving energy.

When the threshold detector 18 accumulates enough energy to exceed a pre-determined threshold (e.g., $V_{REF}$) within a prescribed time period (e.g., half a clock period or so), a determination is made that the energy has exceeded a threshold. At this point, the output state of the clock enable signal T is reversed and remains at this reversed state until the signal is lost for a prescribed period of time and the threshold detector 18 is reset by the OFF/RESET signal at 32 which reverses the clock enable signal T's logic state. The inversion of the clock enable signal T results in the clock starting on command of the threshold detector circuit 18. When the clock is enabled, clock signal CLK is available for driving the intermediate power Stage 2 circuits including data decode logic 26 and any other needed circuits. At this point, the system is in a state of intermediate energy consumption. The lower the clock frequency, the lower the amount of power used by the whole circuit, but the clock frequency should be selected to be high enough so that the circuit is adequately responsive. Hence, the number of clock periods times the length of the reference energy pattern in number of bits should be relatively short. The period length is determined by the sync pattern used for the particular application. Thus, for a remote control application it might be a short as a few bytes. For other wireless applications the period length could be much longer, with greater period length providing greater assurance that no false signal is being received.

Once the clock enable signal T starts clock 22, the serial comparator 28 begins comparing its input signal W, as generated by producing a signal at RF detector 20 representative of the approximately instantaneous presence or absence or RF energy from the LNA 14, with a reference pattern stored at 30 as a binary code in search for a matching synchronization pattern. This search proceeds for as long as there is RF energy bursts detected, without an intervening time out period of no RF detected. When such an intervening time out period is detected, the data decode logic 26 instructs the clock to disable using the OFF/RESET signal at 32, thus shutting down the clock 22, resetting the threshold detector and returning to a low energy consumption "sleep" state. Only one command is decoded, that being the wakeup pattern. Once awakened, the system can decode contents of RF packets or detect infrared signals or otherwise receive data in accord with its intended function. If multiple commands are desired in the low power state, the multiple serial comparators could be used to compare multiple reference patterns.

The predetermined reference energy pattern is flexible and programmable with a length of n bits, where n is an integer greater than one. The comparison result is output to produce a wake-up signal used to wake up the system 40 (e.g., a radio receiver). Thus, the wakeup signal reflects a match with the stored reference pattern of the serial comparator logic 28. If a temporal pattern of radio energy matches the pre-determined pattern stored in reference energy pattern 30 (e.g., a register or memory location), a "true" result will be output. When the Wakeup signal becomes "true", the connected device(s) can be powered up.

At this point, the system controller will assume control and begin running its dedicated application. Once the application is running, Stage 2 and Stage 1 circuitry become independent from everything else going on and are ignored by the system controller until it powers down or off. An example of the application in action is when the TV is on and displaying a program, but there are no RF remote control commands being sent. At this point, stage 1 and Stage 2 are no longer required and eventually Stage 2's clock will be disabled and the threshold detector of Stage 1 will be reset. The LNA and RF detector will always be on.

In this manner, a minimal amount of energy is used to monitor and detect conditions for enabling and powering up more energy consumptive devices. Embodiments consistent with the present embodiments could be used in conjunction with most RF applications where non-continuous use justifies low power consumption state.

In one preferred implementation the absolute minimum number of transistors should be used to accomplish the low power state and intermediate power stage function in order to maintain minimal power drain in standby mode Stage 1 as well as in Stage 2 where a full power up may be imminent. In particular, the pattern comparison device is likely to consume a large share of the energy consumed in Stage 2, so its design has substantial effect on the level of Stage 2 standby power usage.

Figure 3:
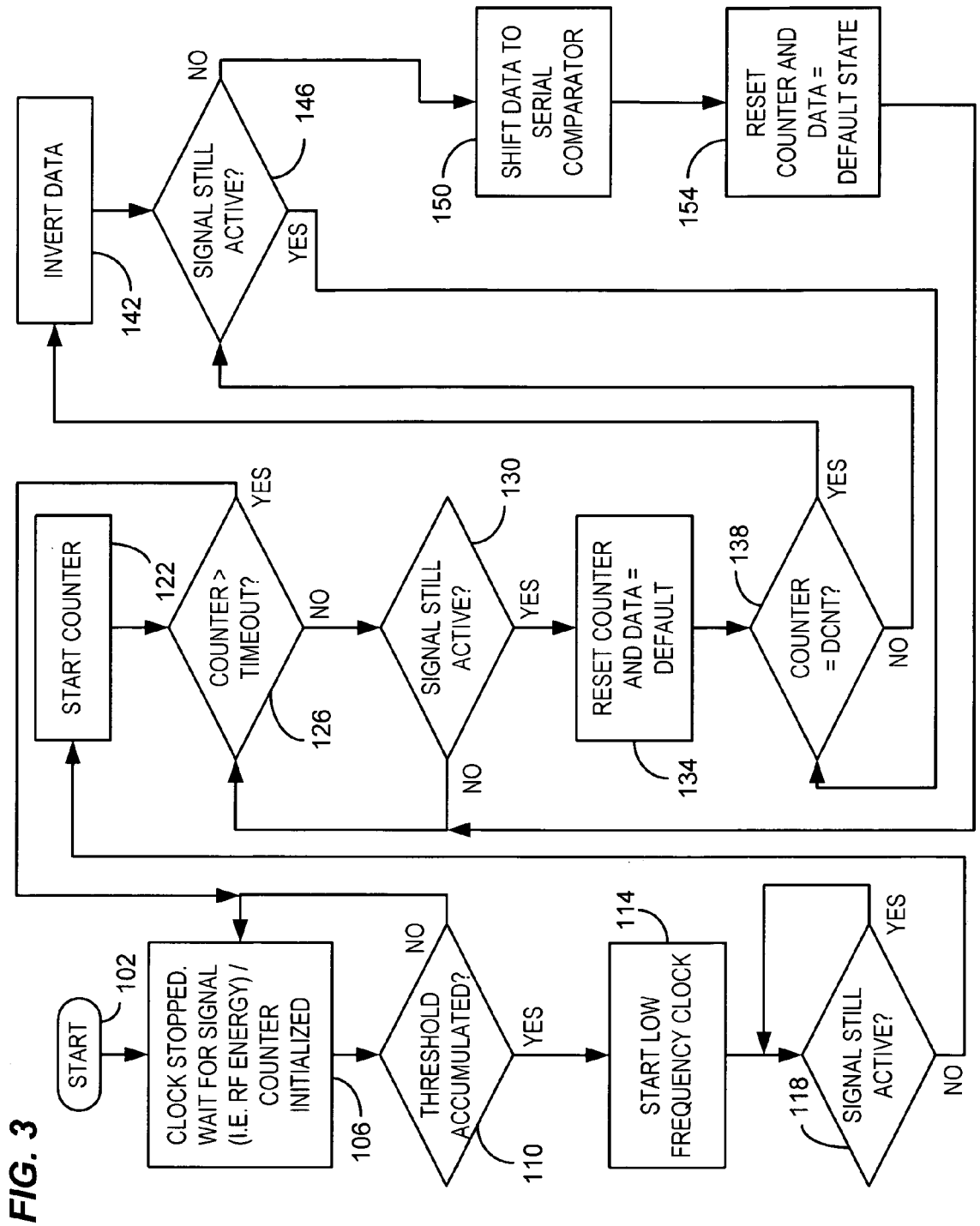
FIG. 3 is a flow chart that describes the operation of the data decode logic of an exemplary embodiment consistent with the present invention.

FIG. 3 depicts a process 100 that is consistent with embodiments of the present invention starting at 102 after which Stage 1 processes are occurring at 106. At 106 the clock is stopped to await a signal indicative of RF energy and any counters used in the process are initialized. At 110, if RF energy has not exceeded the threshold of threshold detector 18, the clock remains stopped at 106. When the threshold has been exceeded at 106 and the presence of RF energy is established at 110, the low frequency clock starts at 114 and Stage 2 operation begins.

As long as the RF signal is instantaneously active (signal W) at 118, the process waits at 118, but when the RF signal instantaneously disappears (signal W) at 118, a counter is started at 122. If the counter times out, control returns to 106 where stage 1 is reentered due to loss of RF signal. If the counter does not exceed the number of counts needed for a timeout and the instantaneous signal is inactive at 130, control passes between 126 and 130. When the instantaneous signal W is active at 130, the counter is reset and the data output from data decode logic 26 is set to a default value (1 or 0) at 134. If the counter is equal to the down count value DCNT at 138, the data inverts at 142. That is, the presence of an RF signal for longer than a specified number of counts DNCT results in inversion of the data signal output from the data decode logic 26. Failure to reach the count DNCT at 138 with the signal still active at 146 results in continued count at 138 results in no inversion of the data that is shifted at 150 into the serial comparator 28 when the instantaneous signal becomes inactive at 146. Reaching the count DCNT causes the data to invert so that the inverse of the current bit is shifted into the serial comparator 28 at 150 when the instantaneous signal becomes inactive. After shifting in the data at 150, the counter is reset and data default state is restored and control returns to 126.

Figure 4:
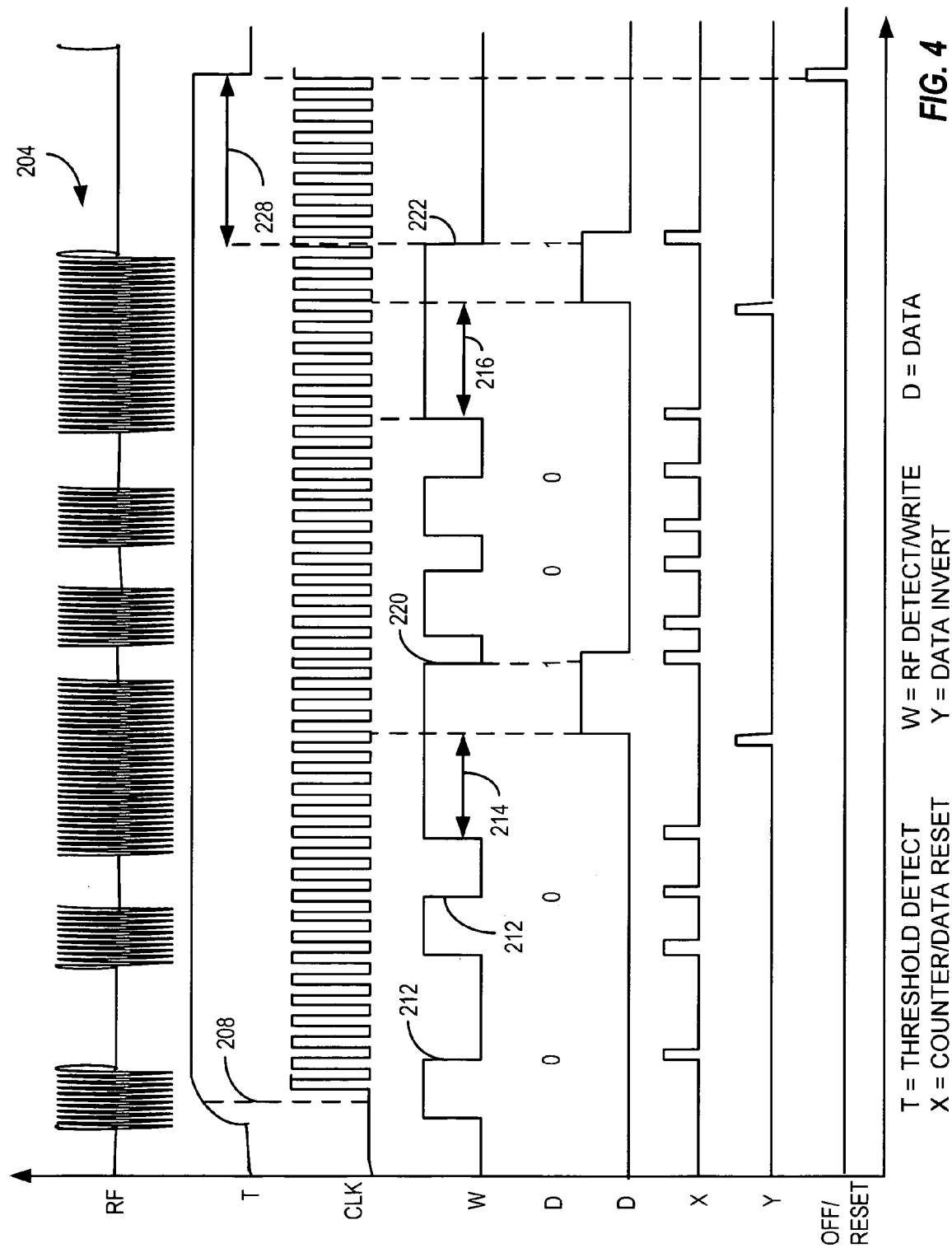
FIG. 4 is a timing diagram consistent with certain embodiments of the present invention.

An example of the signals present at various points in the circuit are depicted in FIG. 4. In this example, the RF signal 204 is shown as bursts of RF energy of either short or longer length. Advantageously, the length of the RF bursts can be made to be non-critical so that a rather "sloppy" clock circuit can be used without need for synchronization or expensive crystal control in many applications. At time 208, the threshold detector 18 signal T reaches an energy threshold that is indicative that energy is present and the clock 22 is enabled and begins running. The data lines D (shown in both binary and as signal levels) represent a value that is clocked in whenever the RF energy is detected by RF detector 20 to have disappeared. These times are shown by the falling edges (e.g., 212) of signal W.

When a prescribed number of clock cycles have lapsed as in the case of 214 and 216, the value of the data inverts and that value is clocked in at the next falling edge of signal W as in 220 and 222 respectively. When a specified number or clock cycles have expired since the last time in which RF energy was present, as at 228, the clock is disabled. Since the timing accuracy needed for determining a 1 from a 0 is only within a few low frequency clock periods, the cost and accuracy of the clock can be extremely low with no detrimental effect.

The data decode logic 26 may generate a count and data reset signal X internally which represents a pulse whenever the write data signal W changes state without a change in the output data state and resets because of a change in RF. Signal Y is also generated internally to data decode logic circuit 26 to represent a change in the state of the output data D and occurs whenever the specified number of clock cycles have passed since the last falling edge of the write data signal W. The OFF signal (OFF/RESET) is produced whenever enough clock counts have passed without RF and is used to discharge the threshold detector and turn off the clock.

Figure 5:
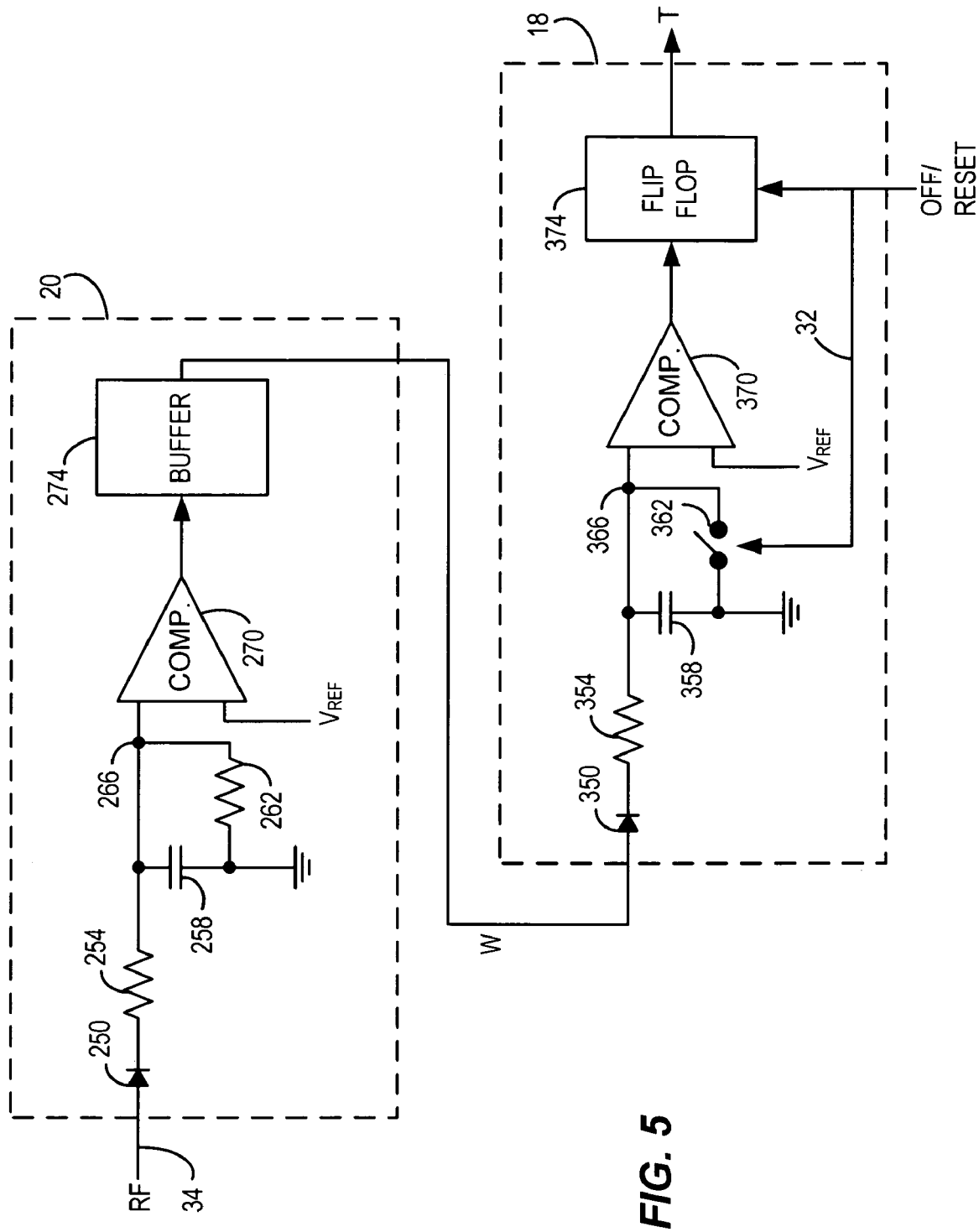
FIG. 5 is a block diagram of an example threshold detector and RF detector circuit consistent with certain embodiments.

FIG. 5 depicts a more detailed circuit diagram of an exemplary RF detect circuit and threshold detector circuit consistent with certain embodiments of the present invention, but many variations are possible. In this embodiment, the RF detector circuit 20 can be devised to resemble an RF detector circuit with a bleed-off resistor 262 using a diode 250 in series with a resistor 254, which is in turn in series with the parallel combination of a capacitor 258 and resistor 262. This produces a detected RF signal at 266 that rapidly increases with increased amplitude of the RF signal by virtue of charge building on capacitor 258. This charge decreases as it is bled off over time by dissipation in resistor 262. Thus, the charge must exceed an amount of voltage over time that will result in a net increase in voltage at node 266 in order to exceed a threshold such as $V_{REF}$ or any suitable reference value (e.g., roughly ½-¾ the peak signal excursion. Node 266 is applied to one input of a comparator 270 with $V_{REF}$ applied to a second input of comparator 270. When the voltage at node 266 exceeds $V_{REF}$, then the comparator produces an output inversion that drives a buffer 274 and also sends signal W to the data decode logic 26. The output of buffer 274 produces a stable version of the output of the comparator 270 which may be used as signal W to drive the data decode logic 26.

The threshold detector 18 can take a similar form that can be devised to resemble an RF detector circuit with a switch used to quickly bleed and deplete the charge on the capacitor on command while retaining a very long time constant. Diode 350 in series with a resistor 354, which is in turn in series with the parallel combination of a capacitor 358 and normally open switch 362. This produces a detected RF signal at 366 that increases with the application of signal W which builds a charge on capacitor 358. This charge increases rapidly and is only bled off by dissipation using controlled switch 362 that closes in response to the OFF/RESET signal. The charge exceeds an amount of voltage over time that results in a net increase in voltage at node 366 in order to exceed a threshold such as $V_{REF}$. Node 366 is applied to one input of a comparator 370 with $V_{REF}$ applied to a second input of comparator 370. When the voltage at node 366 exceeds $V_{REF}$, then the comparator produces an output inversion that drives a flip flop 374 and also sends signal ON to the clock 22 and holds it there and the data decode logic 26. The output of flip flop 374 produces a latched version of the output of the comparator 370 which may be used as signal ON or T to drive the data decode logic 26. Pulsing the OFF/RESET line of flip flop resets its state to OFF and also discharges the capacitor 358 by closing the switch 362. (Note that a smooth curve has been depicted in FIG. 4 for this signal T to emphasize the action of threshold detection, but the signal will actually make rapid state transitions due to the comparator and flip flop.)

Hence, once either the RF signal, sync signal or valid data have disappeared for a specified length of time, the clock can be turned off to enter "sleep" mode again thereby dissipating reduced power. The power can be reduced by implementing the circuit in a remote control device for a television or other home entertainment system, or other electronic entertainment device. But, the circuit can be adapted to many other applications without limitation. When used in a bi-directional remote control device such as a television remote control, the low energy consumption at the remote control can significantly increase battery life at the minor expense of a potential slight increase in the consumption of power from the television receiver device in transmission of the synchronization pattern prior to commands or data to the remote control. The cost on both sides of the transmission can be minimized by virtue of reduced accuracy of the clock circuit and potential elimination of expensive oscillator components.

Figure 6:
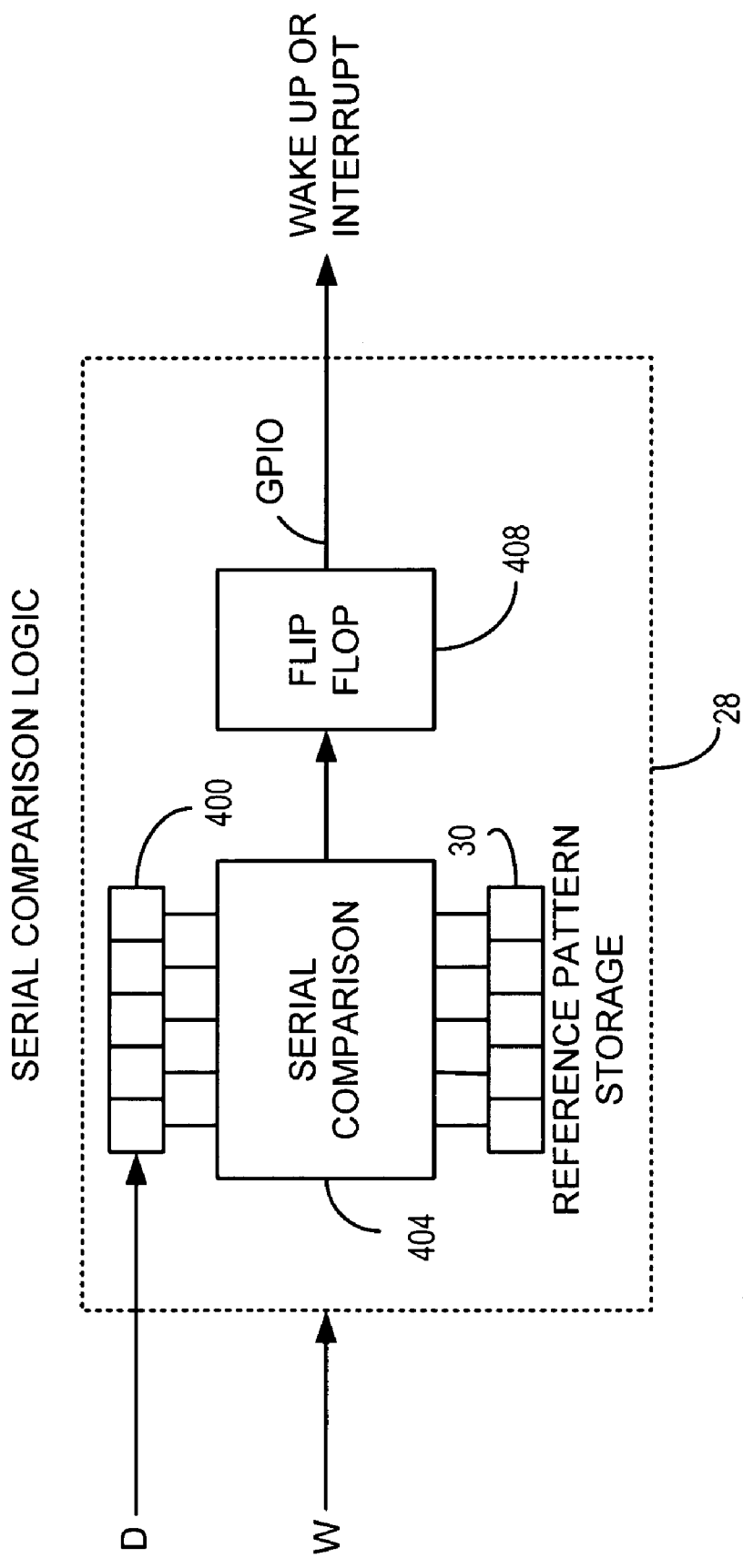
FIG. 6 is a block diagram of an overview of the serial comparator logic circuitry consistent with certain embodiments.

FIG. 6 depicts an exemplary embodiment of serial comparator logic circuit 28. Data signal D enters a shift register 400, being clocked in by signal W. A comparison is made by serial comparison logic circuit 404 to produce an output signal to a flip flop 408 whenever the data present in shift register 400 is the same as the pattern stored in reference storage 30. The output of flip flop 408 serves as wake-up or interrupt signal used to power up to Stage 3. This serial comparator logic circuit 28 can be replicated to a plurality of such circuits that receive data in parallel to compare the data to a plurality of reference patterns in certain embodiments.

Thus, in certain embodiments, a circuit that produces a wake-up signal to control powering up an electronic system has a frequency selective radio frequency (RF) amplifier circuit that amplifies signals within a predetermined frequency range and produces an amplified RF output signal. An RF detector detects the presence of amplified RF output at the output of the amplifier circuit and produces a signal W indicative of the instantaneous presence of the RF output signal. A threshold detector circuit determines if the amplified output signal has reached a predetermined threshold and produces an output signal T. A clock generates a clock signal having clock period in response to the threshold detector output signal T. A data decoder logic circuit turns off the clock in the absence of an RF output signal for a prescribed time period and decodes the RF detector output signal W into a stream of output signals. A serial comparator circuit compares a most recent stream of N output data signals from the data decoder logic circuit with a stored reference pattern, wherein when the most recent stream of N output logic signals from the data decoder logic circuit accumulate and hold circuit matches the stored synchronization pattern the serial comparator circuit generates a wake-up signal that enables power to the electronic system.

In certain embodiments, the system receives data from the serial comparator and in the presence of a valid data pattern, takes an action specified by the valid data pattern. In certain embodiments, the clock is disabled upon detection by the data decoder of a predetermined number of clock pulses from the clock since the output signal W indicates loss of the RF output signal. In certain embodiments, the clock is disabled after a predetermined number of clock pulses from the clock since loss of the RF output signal. In certain embodiments, the clock is disabled upon detection by the data decoder of an invalid synchronization pattern. In certain embodiments, the output data changes state whenever a specific number of clock pulses occur while the RF output signal is present. In certain embodiments, the circuit is embodied within a two way radio frequency entertainment system remote controller, or in a bi-directional home entertainment system remote controller device, or in a remote control circuit in a home entertainment electronic device. In certain embodiments, the circuit has at least one additional serial comparator circuit that compares a most recent stream of N output data signals from the data decoder logic circuit with at least one additional corresponding stored reference pattern, wherein when the most recent stream of N output logic signals from the data decoder logic circuit matches the at least one additional stored synchronization pattern the at least one additional serial comparator circuit generates a wake-up signal that enables power to the electronic system In another circuit for producing a wake-up signal to control powering up an electronic system, a frequency selective radio frequency (RF) amplifier circuit amplifies signals within a predetermined frequency range and produces an amplified RF output signal. An RF detector detects the presence of amplified RF output at the output of the amplifier circuit and produces a signal W indicative of the instantaneous presence of the RF output signal. A threshold detector circuit determines if the amplified output signal has reached a predetermined threshold and produces an output signal T. A clock generates a clock signal having clock period in response to the threshold detector output signal T. A data decoder logic circuit turns off the clock in the absence of an RF output signal for a prescribed time period and decodes the RF detector output signal W into a stream of output signals. A serial comparator circuit compares a most recent stream of N output data signals from the data decoder logic circuit with a stored reference pattern, wherein when the most recent stream of N output logic signals from the data decoder logic circuit accumulate and hold circuit matches the stored synchronization pattern the serial comparator circuit generates a wake-up signal that enables power to the electronic system. The clock is disabled either after a predetermined number of clock pulses from the clock since loss of the RF output signal or upon detection by the data decoder of a predetermined number of clock pulses from the clock since the output signal W indicates loss of the RF output signal, or upon detection by the data decoder of an invalid synchronization pattern.

In certain embodiments, the system receives data from the serial comparator and in the presence of a valid data pattern, takes an action specified by the valid data pattern. In certain embodiments, the output data changes state whenever a specific number of clock pulses occur while the RF output signal is present. In certain embodiments, the circuit is embodied within a two way radio frequency entertainment system remote controller, or in a bi-directional home entertainment system remote controller device, or in a remote control circuit in a home entertainment electronic device. In certain embodiments, the circuit has at least one additional serial comparator circuit that compares a most recent stream of N output data signals from the data decoder logic circuit with at least one additional corresponding stored reference pattern, wherein when the most recent stream of N output logic signals from the data decoder logic circuit matches the at least one additional stored synchronization pattern the at least one additional serial comparator circuit generates a wake-up signal that enables power to the electronic system.

In another circuit for producing a wake-up signal to control powering up an electronic system, a frequency selective radio frequency (RF) amplifier circuit amplifies signals within a predetermined frequency range and produces an amplified RF output signal. An RF detector detects the presence of amplified RF output at the output of the amplifier circuit and produces a signal W indicative of the instantaneous presence of the RF output signal. A threshold detector circuit determines if the amplified output signal has reached a predetermined threshold and produces an output signal T. A clock generates a clock signal having clock period in response to the threshold detector output signal T. A data decoder logic circuit turns off the clock in the absence of an RF output signal for a prescribed time period and decodes the RF detector output signal W into a stream of output signals. A serial comparator circuit compares a most recent stream of N output data signals from the data decoder logic circuit with a stored reference pattern, wherein when the most recent stream of N output logic signals from the data decoder logic circuit accumulate and hold circuit matches the stored synchronization pattern the serial comparator circuit generates a wake-up signal that enables power to the electronic system. The system receives data from the serial comparator and in the presence of a valid data pattern, takes an action specified by the valid data pattern; and the output data changes state whenever a specific number of clock pulses occur while the RF output signal is present.

In certain embodiments, the clock is disabled upon detection by the data decoder of a predetermined number of clock pulses from the clock since the output signal W indicates loss of the RF output signal. In certain embodiments, the clock is disabled after a predetermined number of clock pulses from the clock since loss of the RF output signal. In certain embodiments, the clock is disabled upon detection by the data decoder of an invalid synchronization pattern. In certain embodiments, the circuit is embodied within at least one of a two way radio frequency entertainment system remote controller, a bi-directional home entertainment system remote controller device, and a remote control circuit in a home entertainment electronic device. In certain embodiments, the circuit has at least one additional serial comparator circuit that compares a most recent stream of N output data signals from the data decoder logic circuit with at least one additional corresponding stored reference pattern, wherein when the most recent stream of N output logic signals from the data decoder logic circuit matches the at least one additional stored synchronization pattern the at least one additional serial comparator circuit generates a wake-up signal that enables power to the electronic system. Other embodiments will occur to those skilled in the art upon consideration of the present teachings.

While certain embodiments herein were described in conjunction with specific circuitry that carries out the functions described, other embodiments are contemplated in which the circuit functions are carried out using equivalent embodiments executed on one or more programmed processors. General purpose computers, microprocessor based computers, micro-controllers, optical computers, analog computers, dedicated processors, application specific circuits and/or dedicated hard wired logic, analog circuitry, pluralities of such devices and combinations of such devices in centralized or distributed configurations may be used to construct alternative equivalent embodiments. Other embodiments could be implemented using hardware component equivalents such as special purpose hardware and/or dedicated processors.

While certain illustrative embodiments have been described, it is evident that many alternatives, modifications, permutations and variations will become apparent to those skilled in the art in light of the foregoing description.

The invention claimed is:

1. A circuit that produces a wake-up signal to control powering up an electronic system, comprising:
   a frequency selective radio frequency (RF) amplifier circuit that amplifies signals within a predetermined frequency range and produces an amplified RF output signal;
   an RF detector that detects the presence of amplified RF output at the output of the amplifier circuit and produces a signal W indicative of the instantaneous presence of the RF output signal;
   a threshold detector circuit that determines if the amplified output signal has reached a predetermined threshold and produces an output signal T;
   a clock that generates a clock signal having clock period in response to the threshold detector output signal T;
   a data decoder logic circuit that turns off the clock in the absence of an RF output signal for a prescribed time period and decodes the RF detector output signal W into a stream of output signals; and
   a serial comparator circuit that compares a most recent stream of N output data signals from the data decoder logic circuit with a stored reference pattern, wherein when the most recent stream of N output logic signals from the data decoder logic circuit matches the stored synchronization pattern the serial comparator circuit generates a wake-up signal that enables power to the electronic system.

2. The circuit according to claim 1, wherein the system receives data from the serial comparator and in the presence of a valid data pattern, takes an action specified by the valid data pattern.

3. The circuit according to claim 1, wherein the clock is disabled upon detection by the data decoder of a predetermined number of clock pulses from the clock since the output signal W indicates loss of the RF output signal.

4. The circuit according to claim 1, wherein the clock is disabled after a predetermined number of clock pulses from the clock since loss of the RF output signal.

5. The circuit according to claim 1, wherein the clock is disabled upon detection by the data decoder of an invalid synchronization pattern.

6. The circuit according to claim 1, wherein the output data changes state whenever a specific number of clock pulses occur while the RF output signal is present.

7. The circuit according to claim 1, further comprising at least one additional serial comparator circuit that compares a most recent stream of N output data signals from the data decoder logic circuit with at least one additional corresponding stored reference pattern, wherein when the most recent stream of N output logic signals from the data decoder logic circuit matches the at least one additional stored synchronization pattern the at least one additional serial comparator circuit generates a wake-up signal that enables power to the electronic system 8. The circuit according to claim 1, wherein the circuit is embodied within a two way radio frequency entertainment system remote controller.

9. The circuit according to claim 1, embodied in a bi-directional home entertainment system remote controller device.

10. The circuit according to claim 1, embodied in a remote control circuit in a home entertainment electronic device.

11. A circuit that produces a wake-up signal to control powering up an electronic system, comprising:
 a frequency selective radio frequency (RF) amplifier circuit that amplifies signals within a predetermined frequency range and produces an amplified RF output signal;
 an RF detector that detects the presence of amplified RF output at the output of the amplifier circuit and produces a signal W indicative of the instantaneous presence of the RF output signal;
 a threshold detector circuit that determines if the amplified output signal has reached a predetermined threshold and produces an output signal T;
 a clock that generates a clock signal having clock period in response to the threshold detector output signal T;
 a data decoder logic circuit that turns off the clock in the absence of an RF output signal for a prescribed time period and decodes the RF detector output signal W into a stream of output signals;
 a serial comparator circuit that compares a most recent stream of N output data signals from the data decoder logic circuit with a stored reference pattern, wherein when the most recent stream of N output logic signals from the data decoder logic circuit matches the stored synchronization pattern the serial comparator circuit generates a wake-up signal that enables power to the electronic system; and
 wherein the clock is disabled either after a predetermined number of clock pulses from the clock since loss of the RF output signal or upon detection by the data decoder of a predetermined number of clock pulses from the clock since the output signal W indicates loss of the RF output signal, or upon detection by the data decoder of an invalid synchronization pattern.

12. The circuit according to claim 11, wherein the system receives data from the serial comparator and in the presence of a valid data pattern, takes an action specified by the valid data pattern.

13. The circuit according to claim 11, wherein the output data changes state whenever a specific number of clock pulses occur while the RF output signal is present.

14. The circuit according to claim 11, further comprising at least one additional serial comparator circuit that compares a most recent stream of N output data signals from the data decoder logic circuit with at least one additional corresponding stored reference pattern, wherein when the most recent stream of N output logic signals from the data decoder logic circuit matches the at least one additional stored synchronization pattern the at least one additional serial comparator circuit generates a wake-up signal that enables power to the electronic system 15. The circuit according to claim 11, wherein the circuit is embodied within a two way radio frequency entertainment system remote controller.

16. The circuit according to claim 11, embodied in a bi-directional home entertainment system remote controller device.

17. The circuit according to claim 11, embodied in a remote control circuit in a home entertainment electronic device.

18. A circuit that produces a wake-up signal to control powering up an electronic system, comprising:
 a frequency selective radio frequency (RF) amplifier circuit that amplifies signals within a predetermined frequency range and produces an amplified RF output signal;
 an RF detector that detects the presence of amplified RF output at the output of the amplifier circuit and produces a signal W indicative of the instantaneous presence of the RF output signal;
 a threshold detector circuit that determines if the amplified output signal has reached a predetermined threshold and produces an output signal T;
 a clock that generates a clock signal having clock period in response to the threshold detector output signal T;
 a data decoder logic circuit that turns off the clock in the absence of an RF output signal for a prescribed time period and decodes the RF detector output signal W into a stream of output signals;
 a serial comparator circuit that compares a most recent stream of N output data signals from the data decoder logic circuit with a stored reference pattern, wherein when the most recent stream of N output logic signals from the data decoder logic circuit matches the stored synchronization pattern the serial comparator circuit generates a wake-up signal that enables power to the electronic system;
 wherein the system receives data from the serial comparator and in the presence of a valid data pattern, takes an action specified by the valid data pattern; and
 wherein the output data changes state whenever a specific number of clock pulses occur while the RF output signal is present.

19. The circuit according to claim 18, wherein the clock is disabled upon detection by the data decoder of a predetermined number of clock pulses from the clock since the output signal W indicates loss of the RF output signal.

20. The circuit according to claim 18, wherein the clock is disabled after a predetermined number of clock pulses from the clock since loss of the RF output signal.

21. The circuit according to claim 18, wherein the clock is disabled upon detection by the data decoder of an invalid synchronization pattern.

22. The circuit according to claim 18, further comprising at least one additional serial comparator circuit that compares a most recent stream of N output data signals from the data decoder logic circuit with at least one additional corresponding stored reference pattern, wherein when the most recent stream of N output logic signals from the data decoder logic circuit matches the at least one additional stored synchronization pattern the at least one additional serial comparator circuit generates a wake-up signal that enables power to the electronic system 23. The circuit according to claim 18, wherein the circuit is embodied within at least one of a two way radio frequency entertainment system remote controller, a bi-directional home entertainment system remote controller device, and a remote control circuit in a home entertainment electronic device.

* * * * *